(12) United States Patent
Huang et al.

(10) Patent No.: US 10,908,653 B2
(45) Date of Patent: Feb. 2, 2021

(54) FOLDABLE ELECTRONIC DEVICE AND HINGE MECHANISM THEREOF

(71) Applicant: Acer Incorporated, New Taipei (TW)

(72) Inventors: Yu-Chin Huang, New Taipei (TW); Wen-Neng Liao, New Taipei (TW); Cheng-Wen Hsieh, New Taipei (TW); Yu-Ming Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/460,030

(22) Filed: Jul. 2, 2019

(65) Prior Publication Data
US 2020/0012323 A1    Jan. 9, 2020

(30) Foreign Application Priority Data
Jul. 6, 2018   (TW) .............................. 107123469 A

(51) Int. Cl.
| G06F 1/16 | (2006.01) |
| F16C 11/04 | (2006.01) |
| E05D 11/00 | (2006.01) |
| E05D 3/12 | (2006.01) |

(52) U.S. Cl.
CPC ........... *G06F 1/1681* (2013.01); *E05D 3/122* (2013.01); *E05D 11/00* (2013.01); *F16C 11/04* (2013.01); *G06F 1/1618* (2013.01); *E05Y 2900/606* (2013.01)

(58) Field of Classification Search
CPC ................ G06F 1/1681; G06F 1/1618; E05Y 2900/606; E05D 3/122; E05D 11/00; F16C 11/04
See application file for complete search history.

(56) References Cited

FOREIGN PATENT DOCUMENTS

| CN | 207319132 | * | 5/2018 |
| CN | 207319132 U | | 5/2018 |
| TW | I521151 B | | 2/2016 |
| TW | M537669 U | | 3/2017 |

OTHER PUBLICATIONS

Chinese language office action dated Mar. 15, 2019, issued in application No. TW 107123469.

* cited by examiner

*Primary Examiner* — James Wu
(74) *Attorney, Agent, or Firm* — McClure, Qualey & Rodack, LLP

(57) ABSTRACT

A hinge mechanism is provided, including a fixed member, a rotary member pivotally connected to the fixed member, a pin, a first gear set, and a second gear set. The first and second gear sets are connected to the fixed member and the rod and respectively have a teeth-uncompleted gear. When the rotary member rotates relative to the fixed member from an initial angle to a first angle, the first gear set drives the pin to rotate in a first direction. When the rotary member further rotates relative to the fixed member from the first angle to a second angle, the second gear set drives the ping to rotate in a second direction, which is the opposite of the first direction.

17 Claims, 13 Drawing Sheets

FOLDABLE ELECTRONIC DEVICE AND HINGE MECHANISM THEREOF

CROSS REFERENCE TO RELATED APPLICATIONS

This application claims priority of Taiwan Patent Application Ser. No. 107123469, filed on Jul. 6, 2018, the entirety of which is incorporated by reference herein.

BACKGROUND OF THE INVENTION

Field of the Invention

The application relates in general to a hinge mechanism, and in particular, to a hinge mechanism that can be applied in a foldable electronic device.

Description of the Related Art

Conventional laptop computers usually include a display unit and an input unit foldable with respect to each other. To enhance the cooling efficiency of the laptop computer, a movable bottom cover may be provided on the lower side of the input unit, so that a gap can be formed between the bottom cover and the input unit for rapid heat dissipation.

However, when the display unit rotates over 180 degrees with respect to the input unit, mechanical interference may occur and influence convenience of usage. It has therefore become a challenge to design a hinge mechanism for a foldable electronic device that avoids the aforementioned disadvantages.

BRIEF SUMMARY OF INVENTION

In view of the aforementioned problems, an object of the invention is to provide a hinge mechanism that includes a fixed member, a rotary member pivotally connected to the fixed member, a pin, a first gear set, and a second gear set. The first gear set has a first teeth-uncompleted gear and a first driven gear coupled to each other, wherein the first teeth-uncompleted gear is affixed to the rotary member, and the first driven gear is affixed to the pin. The second gear set has a second teeth-uncompleted gear and a second driven gear coupled to each other, wherein the second teeth-uncompleted gear is affixed to the rotary member, and the second driven gear is affixed to the pin.

In some embodiments, when the rotary member rotates relative to the fixed member from an initial angle to a first angle, the first and second teeth-uncompleted gears rotate along with the rotary member around a first axis, the second driven gear is disengaged from the second teeth-uncompleted gear, and the first teeth-uncompleted gear drives the first driven gear and the pin to rotate in a first direction around a second axis from a predetermined position to an open position.

In some embodiments, when the rotary member rotates relative to the fixed member from the first angle to a second angle, the first and second teeth-uncompleted gears are rotated along with the rotary member around the first axis, the first driven gear is disengaged from the first teeth-uncompleted gear, and the second teeth-uncompleted gear drives the second driven gear and the pin to rotate in a second direction around the second axis from the open position to the predetermined position, wherein the second direction is opposite the first direction.

In some embodiments, the first gear set further has an intermediate gear coupling the first teeth-uncompleted gear with the first driven gear.

In some embodiments, the first teeth-uncompleted gear has a first no-teeth portion, and when the rotary member rotates relative to the fixed member from the first angle to a second angle, the intermediate gear is in a location that corresponds to the first no-teeth portion.

In some embodiments, the second gear set further has an intermediate gear coupling the second teeth-uncompleted gear with the second driven gear.

In some embodiments, the second teeth-uncompleted gear has a second no-teeth portion, and when the rotary member rotates relative to the fixed member from the initial angle to a first angle, the intermediate gear is in a location that corresponds to the second no-teeth portion.

In some embodiments, the first teeth-uncompleted gear has a first no-teeth portion, and the second teeth-uncompleted gear has a second no-teeth portion, wherein the first and second no-teeth portions are located on opposite sides of a plane defined by the first and second axes.

In some embodiments, the hinge mechanism further includes a third gear set having a driving gear and a fixed gear coupled with each other, wherein the driving gear and the fixed gear are respectively connected to the rotary member and the fixed member.

Another object of the invention is to provide a foldable electronic device including a display unit, an input unit, and the hinge mechanism as mentioned above. In some embodiments, the rotary member of the hinge mechanism is connected to the display unit, and the fixed member of the hinge mechanism is connected to the input unit.

In some embodiments, when the rotary member rotates relative to the fixed member from the initial angle to the first angle, the pin rotates from the predetermined position to the open position and protrudes from a lower side of the input unit.

In some embodiments, the foldable electronic device further includes a bottom cover connected to the input unit, wherein when the rotary member rotates relative to the fixed member from the initial angle to the first angle, the pin pushes the bottom cover to form a gap between the bottom cover and the input unit.

In some embodiments, when the foldable electronic device includes a laptop computer.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the foldable electronic device and hinge mechanism thereof are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
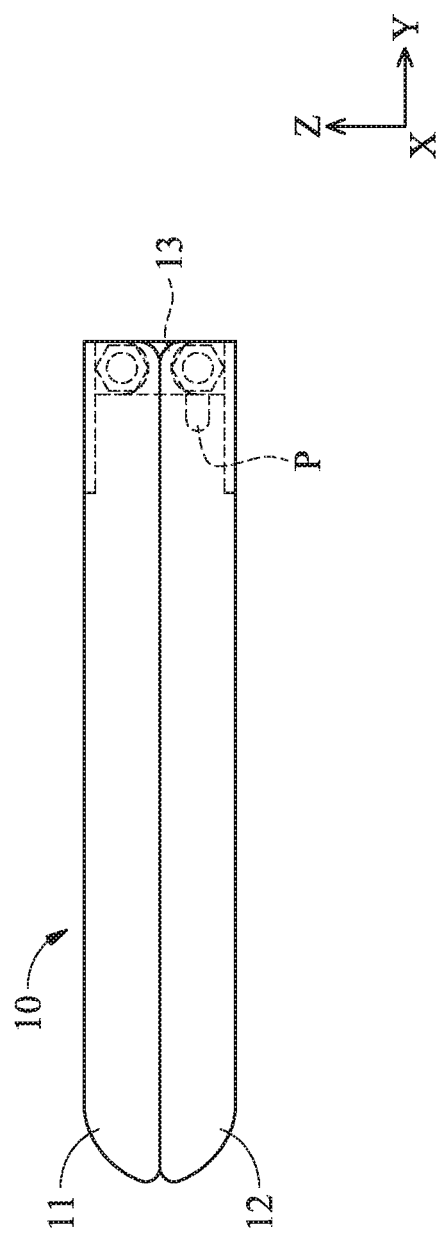
FIG. 1 shows a side view of a foldable electronic device 10 in a closed state in accordance with an embodiment of the invention.
Figure 2:
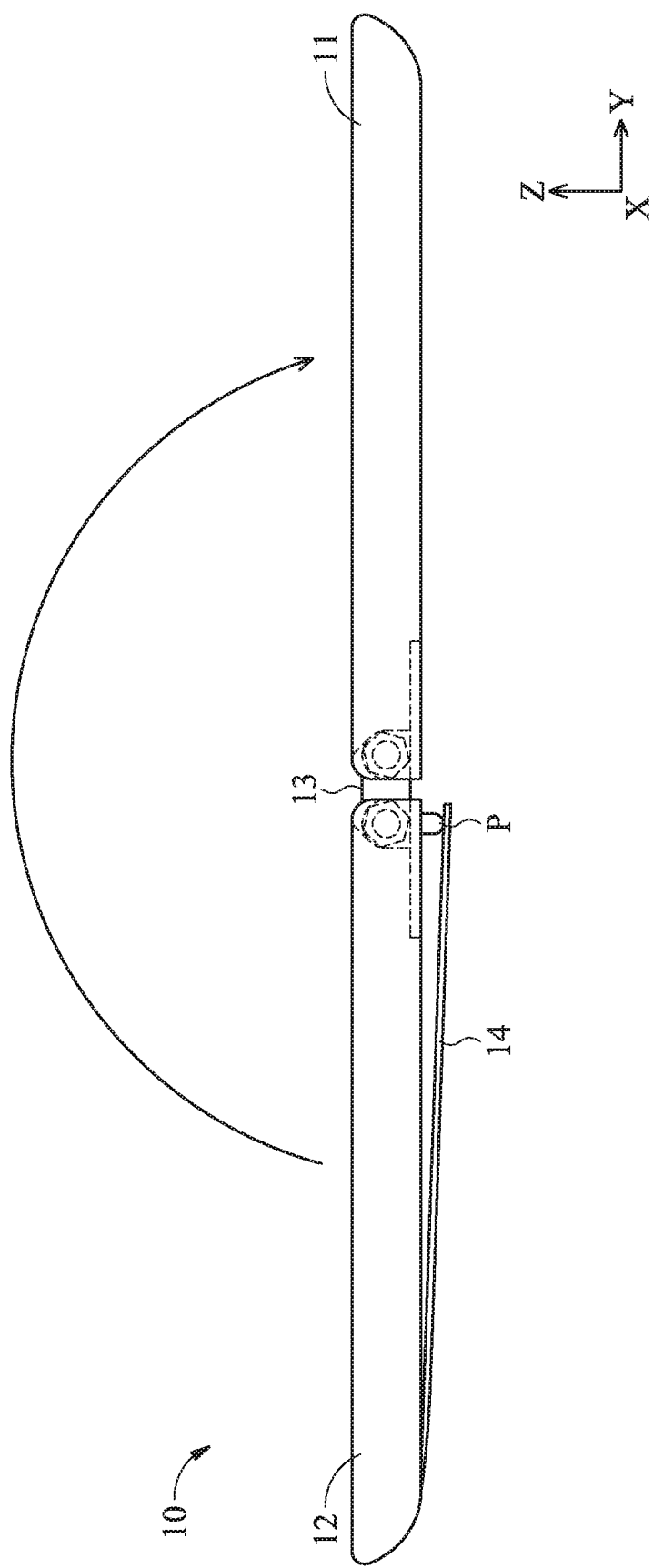
FIG. 2 shows the foldable electronic device 10 of FIG. 1 in an unfolded state.
Figure 3:
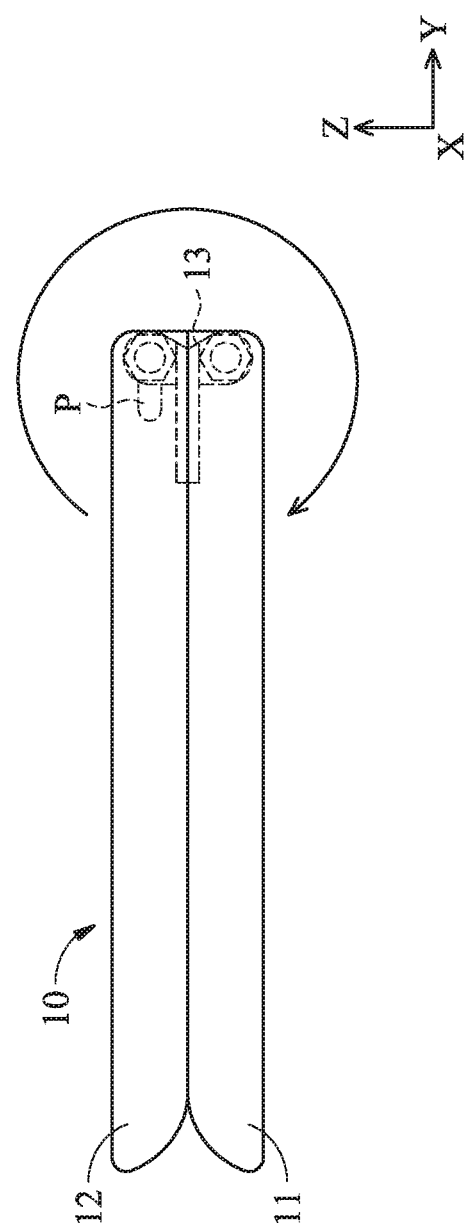
FIG. 3 shows the foldable electronic device 10 of FIG. 1 in a flipped state.

FIG. 1 shows a side view of a foldable electronic device 10 in a closed state in accordance with an embodiment of the invention, FIG. 2 shows the foldable electronic device 10 of FIG. 1 in an unfolded state, and FIG. 3 shows the foldable electronic device 10 of FIG. 1 in a flipped state. Referring in FIGS. 1-3, the foldable electronic device 10 may be a laptop computer that primarily comprises a display unit 11, an input unit 12, and a hinge mechanism 13 pivotally connecting the display unit 11 and the input unit 12.

As shown in FIG. 1, when the foldable electronic device 10 is in the closed state, a pin P of the hinge mechanism 13 is situated in a predetermined position and accommodated in the input unit 12. When the display unit 11 rotates 180 degrees relative to the input unit 12, the foldable electronic device 10 can be switched to the unfolded state, wherein the pin P rotates from the predetermined position of FIG. 1 and pushes the bottom cover 14 downwardly, so that a gap is generated between the input unit 12 and the bottom cover 14. Therefore, heat inside the foldable electronic device 10 can be rapidly dissipated through the gap.

Furthermore, when the display unit 11 rotates 360 degrees relative to the input unit 12 (FIG. 3), the foldable electronic device 10 can be switched to the flipped state, wherein the display surface of the display unit 11 faces downward toward the −Z direction. In this embodiment, when the display unit 11 rotates over 180 degrees relative to the input unit 12, the pin P of the hinge mechanism 13 can retract into the input unit 12 to prevent mechanical interference between the pin P and the display unit 11. The detailed configuration of the hinge mechanism 13 is described below.

Figure 4:
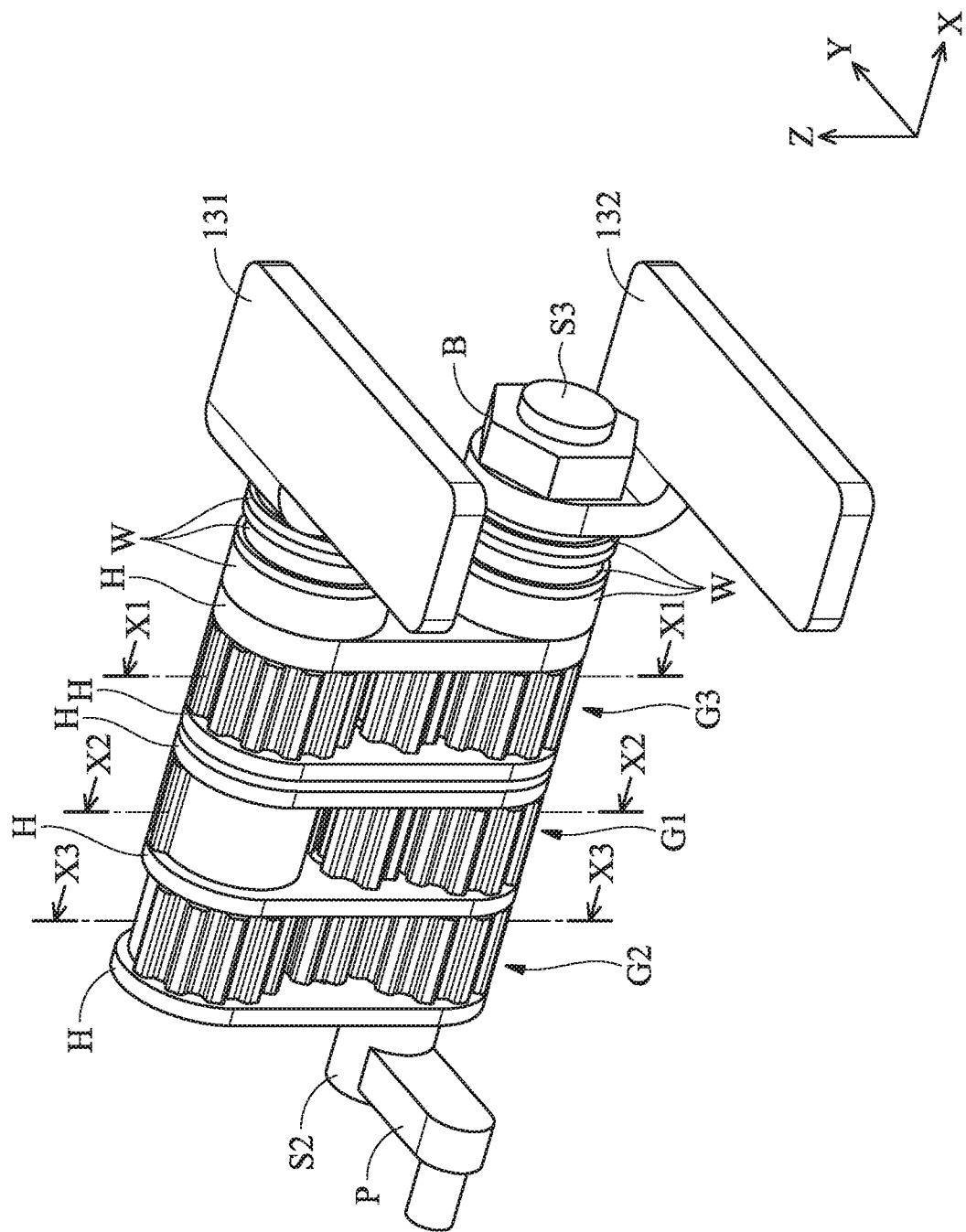
FIG. 4 shows a perspective diagram of the hinge mechanism 13 in accordance with an embodiment of the invention.
Figure 5:
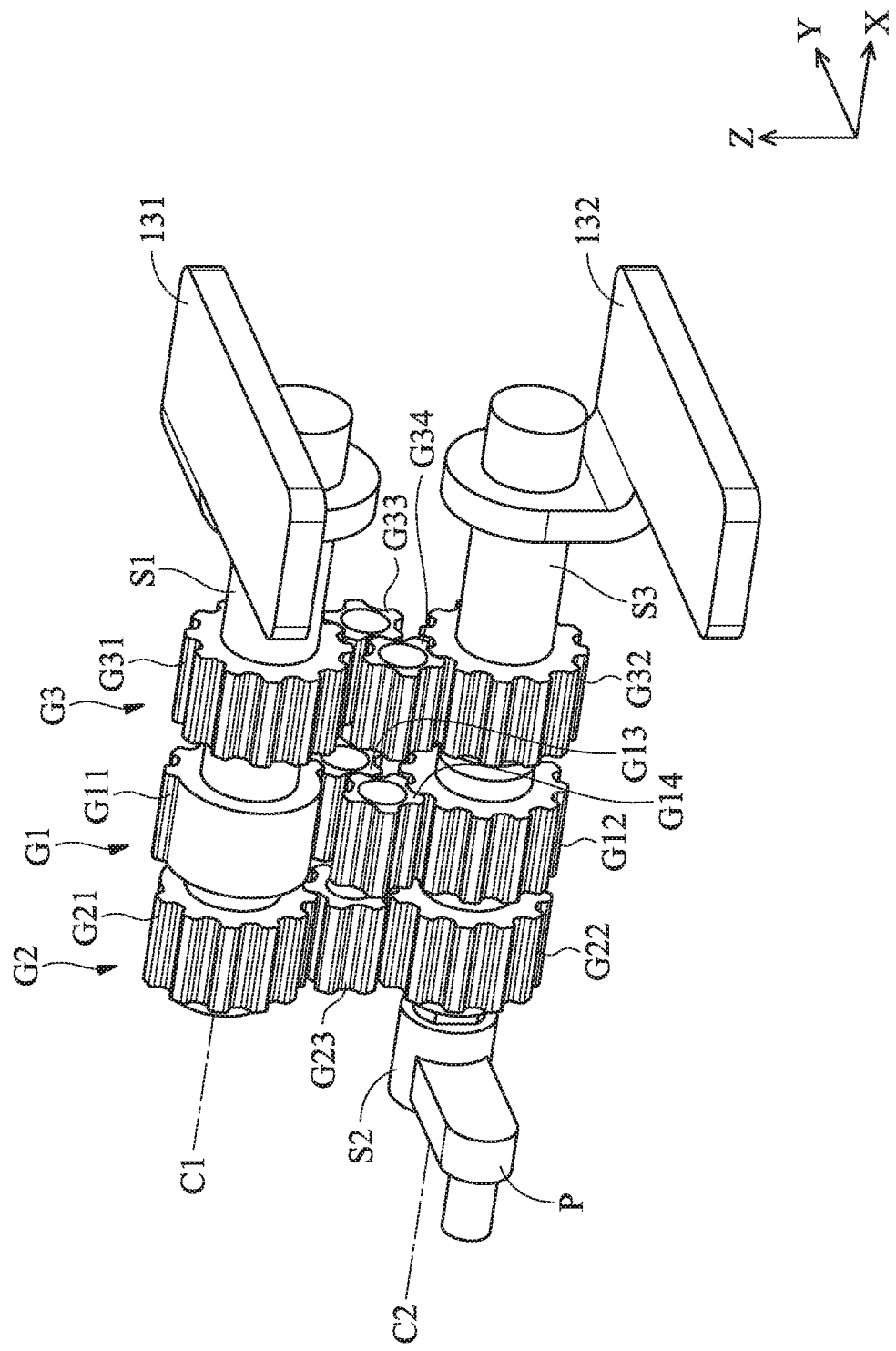
FIG. 5 shows a perspective diagram of the hinge mechanism 13 in FIG. 4 with the housings H, the torque resistance elements W and the nuts B omitted therefrom.

FIG. 4 shows a perspective diagram of the hinge mechanism 13 in accordance with an embodiment of the invention, and FIG. 5 shows a perspective diagram of the hinge mechanism 13 in FIG. 4 with the housings H, the torque resistance elements W and the nuts B omitted therefrom. Referring to FIGS. 4 and 5, the hinge mechanism 13 in this embodiment primarily comprises a rotary member 131, a fixed member 132, a pin P, a first gear set G1, a second gear set G2, and a third gear set G3. The rotary member 131 and the fixed member 132 are respectively affixed to the display unit 11 and the input unit 12 shown in FIGS. 1-3. The first, second, and third gear sets G1, G2, and G3 are disposed in the housings H. The housings H are affixed to each other and separate the first, second, and third gear sets G1, G2, and G3 from each other.

As shown in FIG. 4, at least a torque resistance element W is disposed between the rotary member 131 and one of the housings H. Similarly, at least a torque resistance element W is disposed between the fixed member 132 and one of the housings H. The torque resistance elements W may comprise sheet metal spring or washer with high friction coefficient, so as to provide appropriate torque resistance during the rotation of the rotary member 131 relative to the fixed member 132. In this embodiment, the rotary member 131 and the fixed member 132 can be firmly secured to a side of the torque resistance elements W by the nuts B.

As shown in FIG. 5, the first gear set G1 has a first teeth-uncompleted gear G11, a first driven gear G12, and two intermediate gears G13 and G14. The first teeth-uncompleted gear G11 and the first driven gear G12 can be coupled to each other by the intermediate gears G13 and G14. The second set G2 has a second teeth-uncompleted gear G21, a second driven gear G22, and an intermediate gear G23. The second teeth-uncompleted gear G21 and the second driven gear G22 can be coupled to each other by the intermediate gear G23.

It should be noted that the rotary member 131 and the first and second teeth-uncompleted gears G11 and G21 are affixed to a shaft S1, and they can rotate around a first axis C1 of the shaft S1. Moreover, the pin P and the first and second driven gears G11 and G12 are affixed to another shaft S2, and they can rotate around a second axis C2 of the shaft S2.

Still referring to FIG. 5, the third gear set G3 has a driving gear G31, a fixed gear G32, and two intermediate gears G33 and G34. The driving gear G31 and the fixed gear G32 are coupled to each other by the intermediate gears G33 and G34. Here, the driving gear G31 is affixed to the shaft S1 and rotatable around the first axis C1. Additionally, the fixed member 132 and the fixed gear G32 are mounted to a fixed shaft S3.

Figure 6:
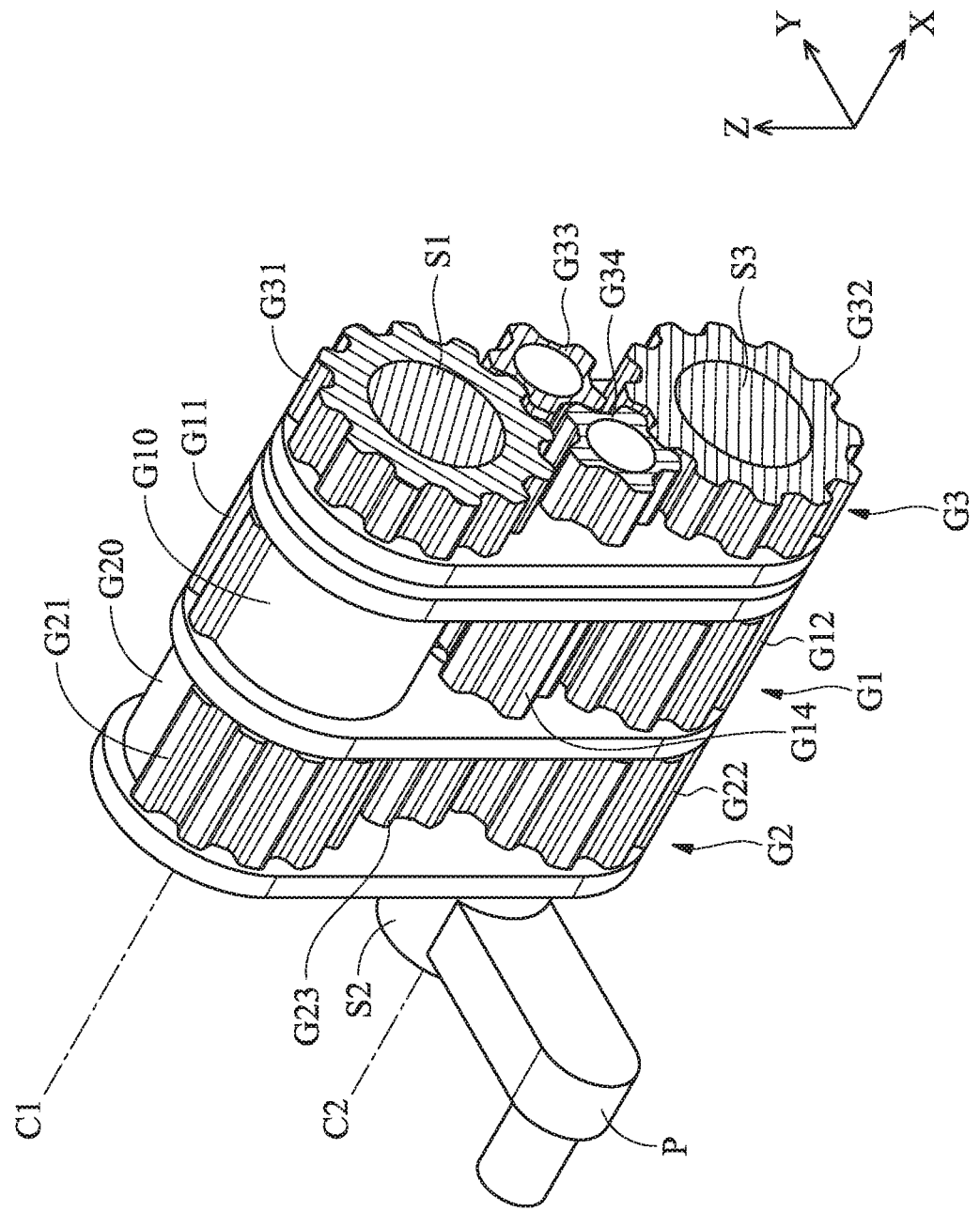
FIG. 6 shows a cross-sectional view along line X1-X1 of FIG. 4.
Figure 7:
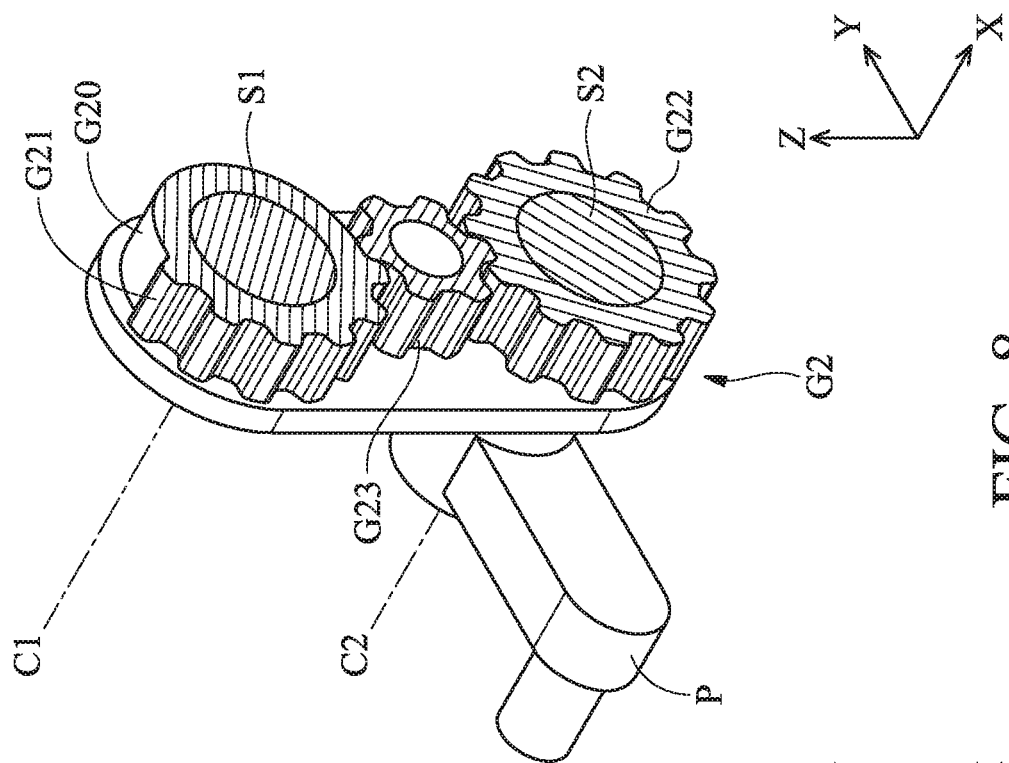
FIG. 7 shows a cross-sectional view along line X2-X2 of FIG. 4.
Figure 8:
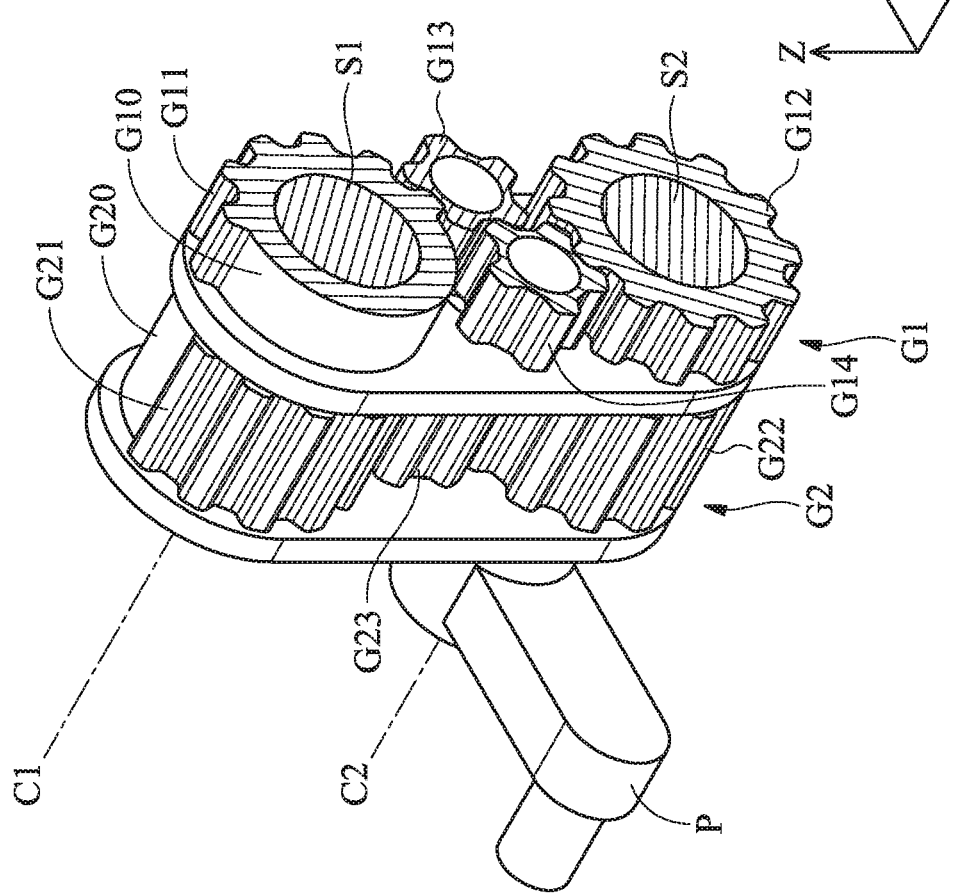
FIG. 8 shows a cross-sectional view along line X3-X3 of FIG. 4.

FIG. 6 shows a cross-sectional view along line X1-X1 of FIG. 4, FIG. 7 shows a cross-sectional view along line X2-X2 of FIG. 4, and FIG. 8 shows a cross-sectional view along line X3-X3 of FIG. 4. Referring to FIGS. 4-8, when the foldable electronic device 10 is in the closed state of FIG. 1, the rotary member 131, the fixed member 132, and the pin P of the hinge mechanism 13 are substantially parallel to the XY plane (FIG. 4), wherein the pin P is situated in a predetermined position and concealed by the input unit 12. In this state, the intermediate gear G13 of the first gear set G1 is located close to an end of a first no-teeth portion G10 of the first teeth-uncompleted gear G11 (FIG. 7), and the intermediate gear G23 of the second gear set G2 is located close to an end of a second no-teeth portion G20 of the second teeth-uncompleted gear G21 (FIG. 8), wherein the first and second no-teeth portions G10 and G20 are situated on opposite sides of a plane that is defined by the first and second axes C1 and C2 and parallel to the XZ plane.

Figure 9:
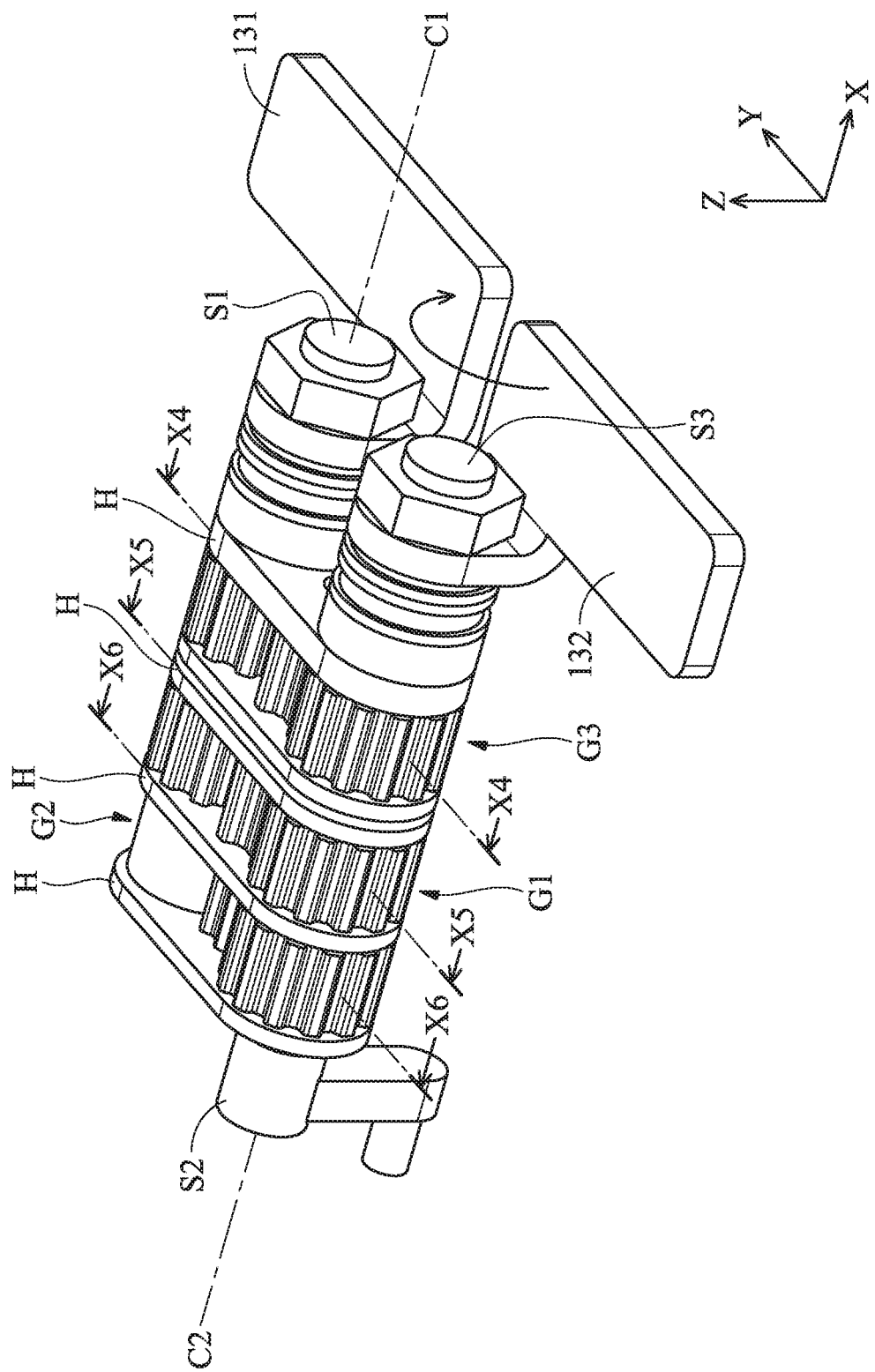
FIG. 9 shows the rotary member 131 rotates from 0 degrees to 180 degrees relative to the fixed member 132.
Figure 10:
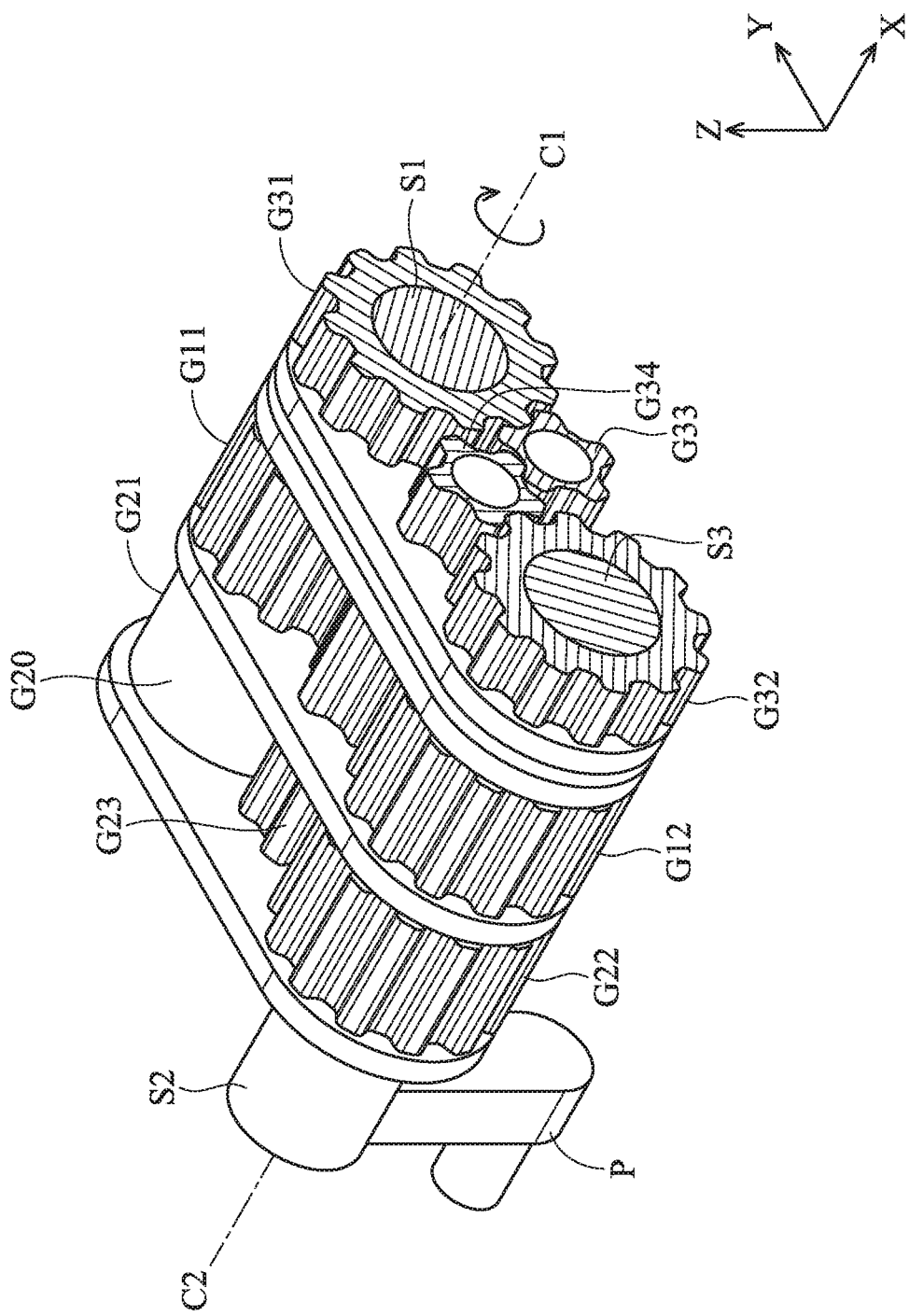
FIG. 10 shows a cross-sectional view along line X4-X4 of FIG. 9.
Figure 12:
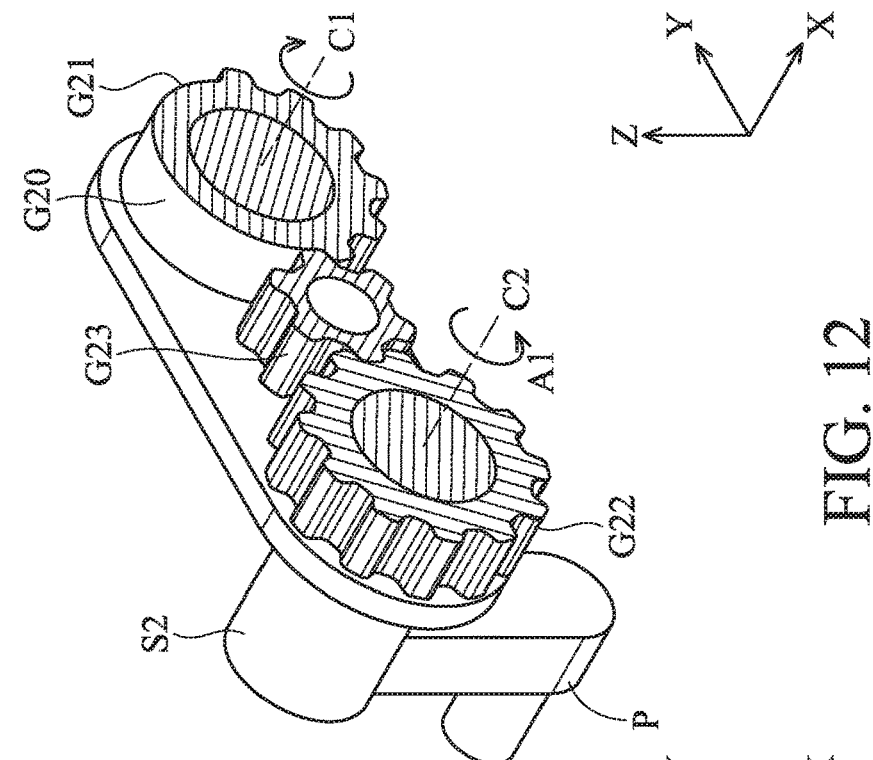
FIG. 12 shows a cross-sectional view along line X6-X6 of FIG. 9.
Figure 11:
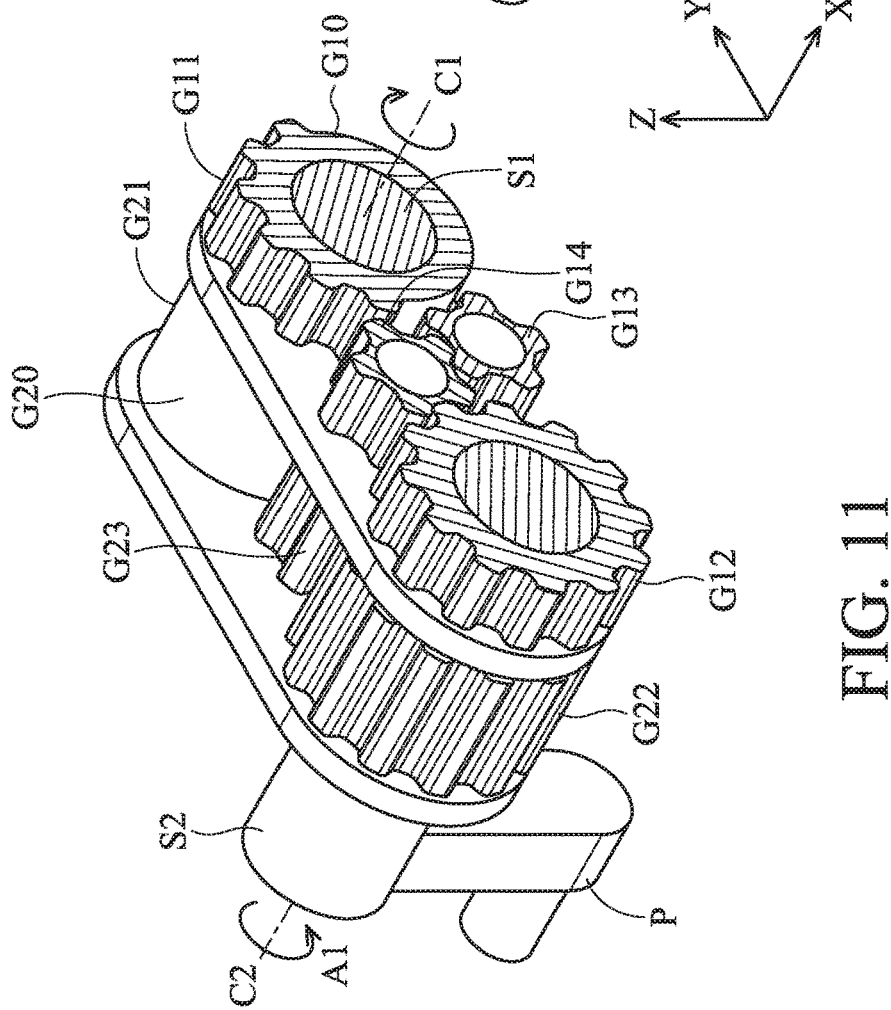
FIG. 11 shows a cross-sectional view along line X5-X5 of FIG. 9.

Referring to FIGS. 9-12, FIG. 9 shows the rotary member 131 rotates from 0 degrees to 180 degrees relative to the fixed member 132, FIG. 10 shows a cross-sectional view along line X4-X4 of FIG. 9, FIG. 11 shows a cross-sectional view along line X5-X5 of FIG. 9, and FIG. 12 shows a cross-sectional view along line X6-X6 of FIG. 9. When the foldable electronic device 10 is switched from the closed state of FIG. 1 to the unfolded state of FIG. 2, the rotary member 131 rotates from 0 degrees to 180 degrees relative to the fixed member 132 (as the arrow indicates in FIG. 9), and the pin P rotates downward to protrude from the bottom of the input unit 12. Thus, the bottom cover 14 is pushed to form a gap between the input unit 12 and the bottom cover 14 (FIG. 2), and heat inside the foldable electronic device 10 can be rapidly dissipated through the gap.

During the rotation of the rotary member 131 from 0 degrees to 180 degrees relative to the fixed member 132, as shown in FIG. 9, the first, second, third gear sets G1, G2, G3, and the housings H rotate 90 degrees along with the gears to an angle parallel to the XY plane. As the arrow indicates in FIG. 11, since the rotary member 131 forces the driving gear G31 and the first and second teeth-uncompleted gears G11 and G21 to rotate around the first axis C1 of the first shaft S1, the first teeth-uncompleted gear G11 can drive the first driven gear G12 and the pin P to rotate around the second axis C2 of the second shaft S2 with its teeth. Therefore, the pin P rotates to an open position toward the −Z direction and protrudes downward from the input unit 12.

As shown in FIG. 12, during the rotation of the rotary member 131 from 0 degrees to 180 degrees relative to the fixed member 132, the intermediate gear G23 of the second gear set G2 is in a location that corresponds to the second no-teeth portion G20 of the second teeth-uncompleted gear G21, so that the intermediate gear G23 and the second teeth-uncompleted gear G21 remain disengaged with each other. In this stage, the second driven gear G22 can only rotate along with the first driven gear G12 in a first direction A1 around the second axis C2 (FIG. 12), and it cannot be driven by the second teeth-uncompleted gear G21. That is, during the rotation of the rotary member 131 from 0 degrees to 180 degrees relative to the fixed member 132, the pin P can only be driven to rotate around the second axis C2 by the first gear set G1, and it is not influenced by the second teeth-uncompleted gear G21 of the second gear set G2.

Figure 13:
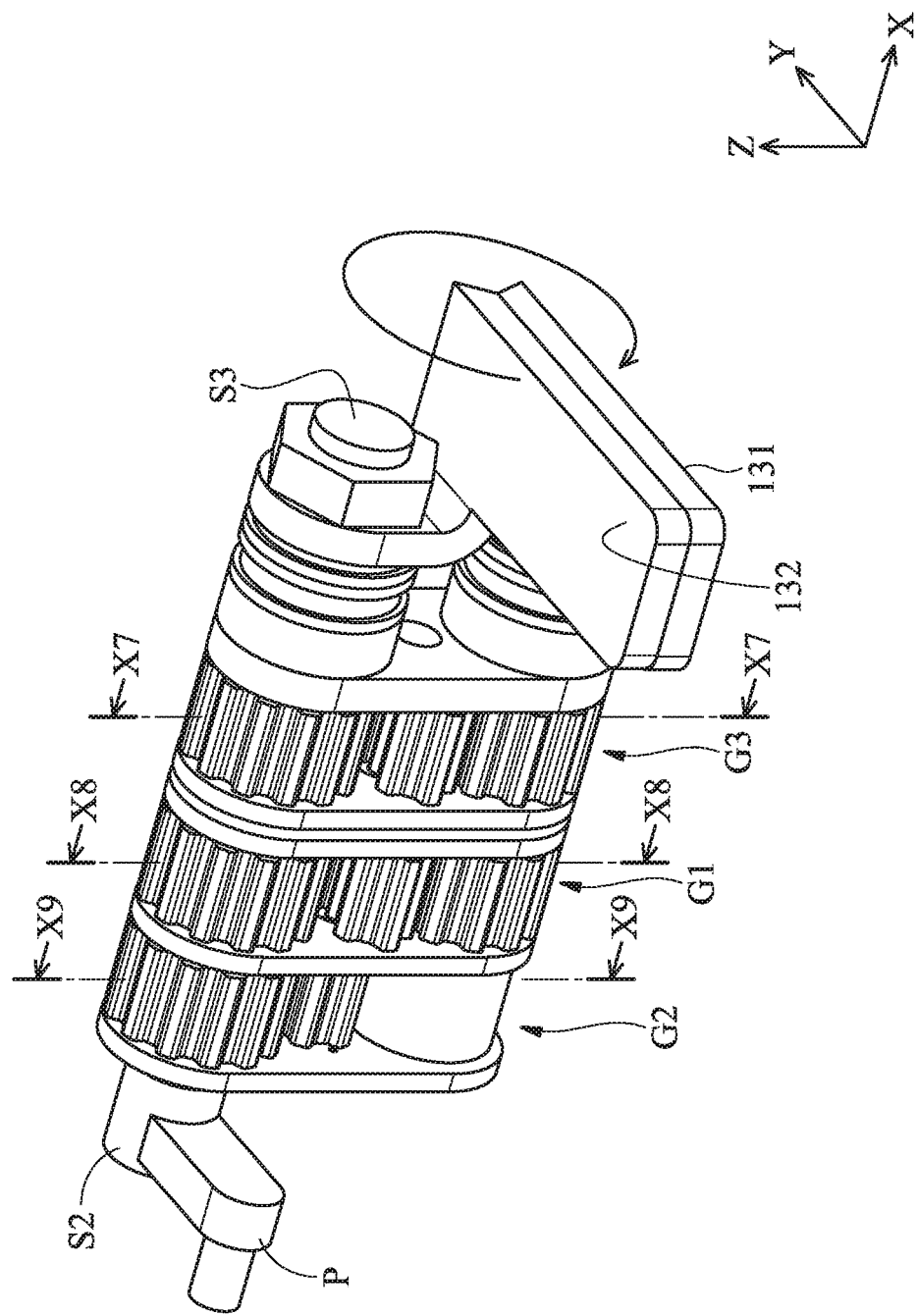
FIG. 13 shows the rotary member 131 rotates 360 degrees relative to the fixed member 132.
Figure 14:
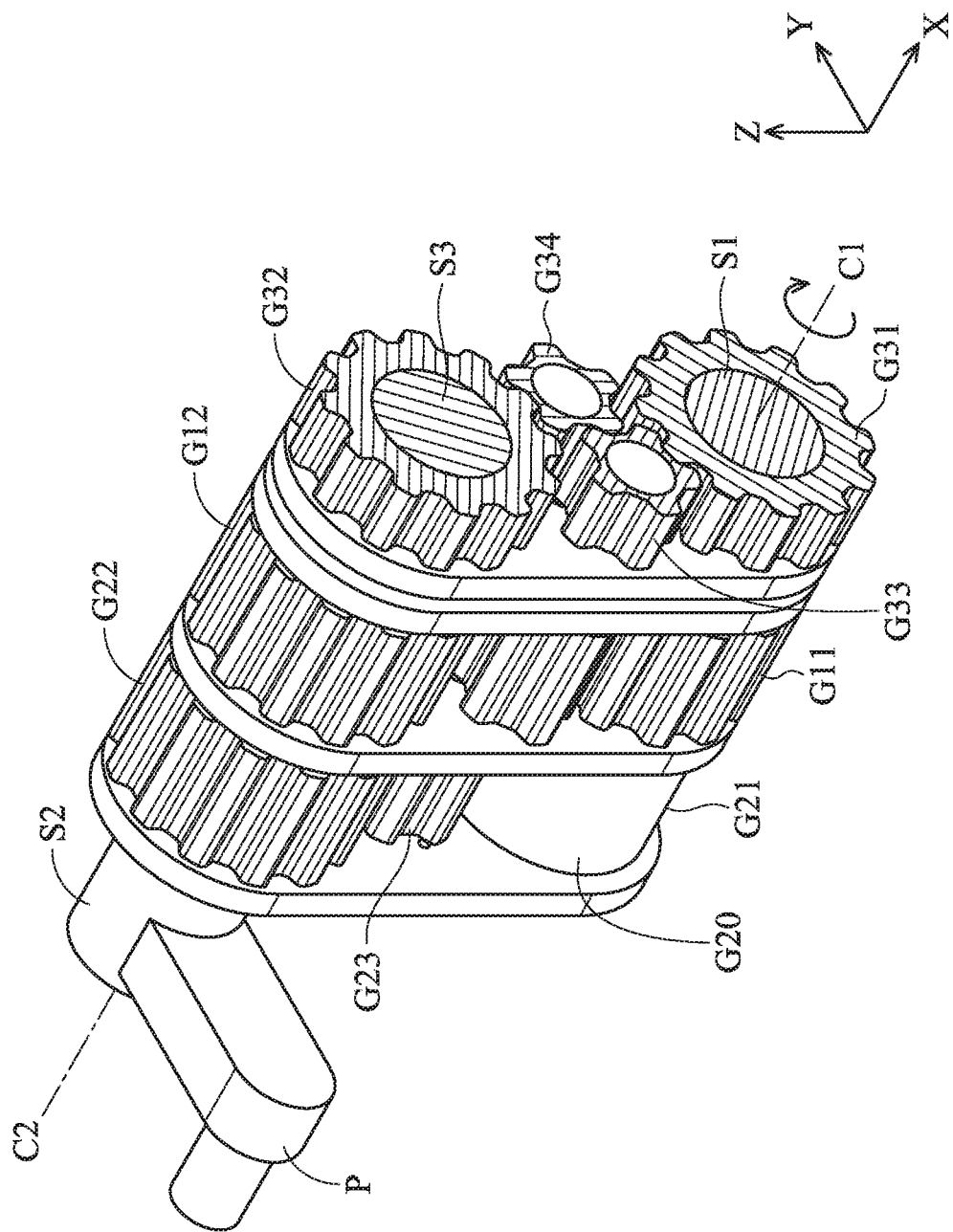
FIG. 14 shows a cross-sectional view along line X7-X7 of FIG. 13.
Figure 16:
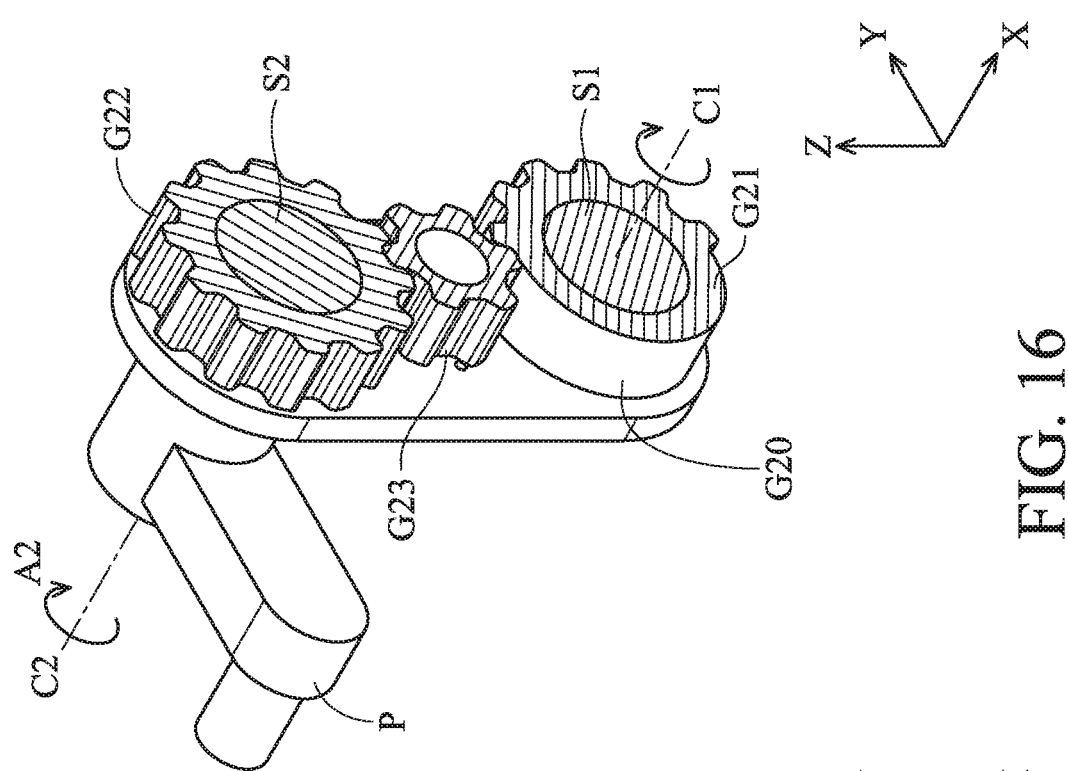
FIG. 16 shows a cross-sectional view along line X9-X9 of FIG. 13.
Figure 15:
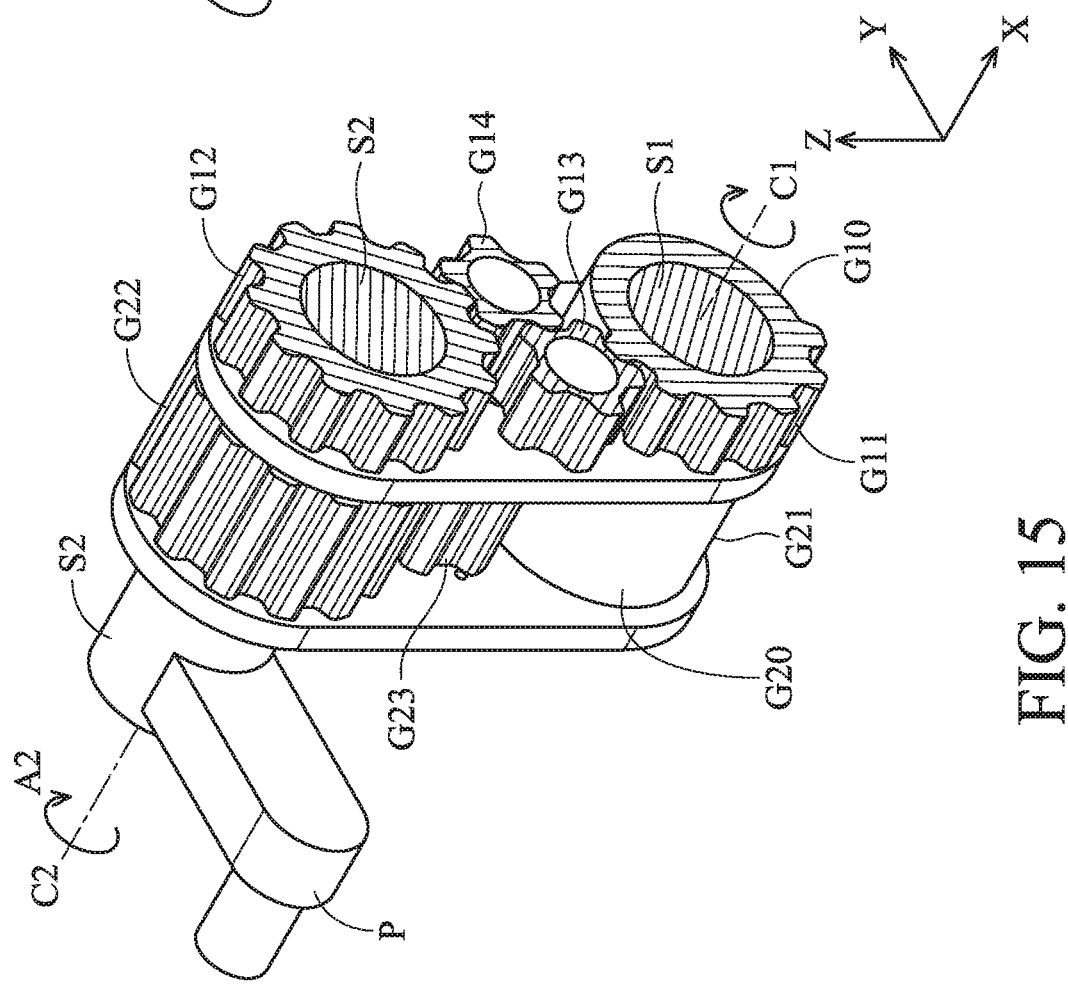
FIG. 15 shows a cross-sectional view along line X8-X8 of FIG. 13.

Referring to FIGS. 13-16, FIG. 13 shows the rotary member 131 rotates 360 degrees relative to the fixed member 132, FIG. 14 shows a cross-sectional view along line X7-X7 of FIG. 13, FIG. 15 shows a cross-sectional view along line X8-X8 of FIG. 13, and FIG. 16 shows a cross-sectional view along line X9-X9 of FIG. 13. When the foldable electronic device 10 is switched from the unfolded state of FIG. 2 to the flipped state of FIG. 3, the rotary member 131 of the hinge mechanism 13 rotates from 180 degrees to 360 degrees relative to the fixed member 132 (as the arrow indicates in FIG. 13). In this stage, the pin P returns back to the predetermined position and is concealed in the input unit 12 (FIG. 3), thereby preventing mechanical interference between the pin P and the display unit 11.

As shown in FIG. 13, during the rotation of the rotary member 131 from 180 degrees to 360 degrees relative to the fixed member 132, owing to the fixed gear G32 and the fixed shaft S3 mounted to the fixed member 132, the first, second, third gear sets G1, G2, G3, and the housings H are rotated 180 degrees (upside down) along with the gears to an angle perpendicular to the XY plane. Moreover, as the arrow indicates in FIG. 16, since the rotary member 131 forces the driving gear G31 and the first and second teeth-uncompleted gears G11 and G21 to rotate around the first axis C1 of the first shaft S1, the second teeth-uncompleted gear G21 can drive the second driven gear G22 and the pin P to rotate around the second axis C2 in a second direction A2 with its teeth. Therefore, the pin P can retract into the input unit 12 to be substantially parallel to the XY plane, wherein the second direction A2 is opposite the first direction A1 shown in FIGS. 11 and 12.

Referring to FIG. 15, during the rotation of the rotary member 131 from 180 degrees to 360 degrees relative to the fixed member 132, the intermediate gear G13 of the first gear set G1 is in a location that corresponds to the first no-teeth portion G10 of the first teeth-uncompleted gear G11, so that the intermediate gear G13 and the first teeth-uncompleted gear G11 remain disengaged with each other. In this stage, the first driven gear G12 can only rotate along with the second driven gear G22 in the second direction A2 around the second axis C2 (FIG. 15), and it cannot be driven by the first teeth-uncompleted gear G11. That is, during the rotation of the rotary member 131 from 180 degrees to 360 degrees relative to the fixed member 132, the pin P can only be driven to rotate around the second axis C2 to the predetermined position by the second gear set G2, and it is not influenced by the first gear set G1.

In summary, when the rotary member 131 rotates relative to the fixed member 132 from 0 degrees (initial angle) to 180 degrees (first angle), the rotary member 131 drives the first and second teeth-uncompleted gears G11 and G21 to rotate around the first axis C1, so that the first teeth-uncompleted gear G11 drives the first driven gear G12 and the pin P to rotate in a first direction A1 around the second axis C2 from a predetermined position to an open position, wherein the second driven gear G22 is disengaged with the second teeth-uncompleted gear G21.

Additionally, when the rotary member 131 further rotates relative to the fixed member 132 from 180 degrees (first angle) to 360 degrees (second angle) relative to the fixed member 132, the rotary member 131 drives the first and second teeth-uncompleted gears G11 and G21 to rotate around the first axis C1, so that the second teeth-uncompleted gear G21 drives the second driven gear G22 and the pin P to rotate in a second direction A2 around the second axis C2 from the open position to the predetermined position, wherein the first driven gear G12 is disengaged with the first teeth-uncompleted gear G11. In this configuration, once the rotary member 131 rotates over 180 degrees (first angle) relative to the fixed member 132, the pin P can automatically return to the predetermined position and retract into the input unit 12 (FIG. 3), so that mechanical interference between the pin P and the display unit 11 can be efficiently avoided.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A hinge mechanism, comprising:
    a fixed member;
    a first shaft;
    a second shaft;
    a rotary member, affixed to the first shaft and rotatably connected to the fixed member;
    a pin, affixed to the second shaft;
    a first gear set, having a first teeth-uncompleted gear and a first driven gear coupled to each other, wherein the first teeth-uncompleted gear is affixed to the first shaft, and the first driven gear is affixed to the second shaft; and
    a second gear set, having a second teeth-uncompleted gear and a second driven gear coupled to each other, wherein the second teeth-uncompleted gear is affixed to the first shaft, and the second driven gear is affixed to the second shaft;
    wherein when the rotary member rotates relative to the fixed member from an initial angle to a first angle that is greater than the initial angle, the first and second teeth-uncompleted gears and the first shaft rotate along with the rotary member around a first axis, the second driven gear is disengaged from the second teeth-uncompleted gear, and the first teeth-uncompleted gear drives the second shaft, the first driven gear and the pin to rotate in a first direction around a second axis from a predetermined position to an open position;
    wherein when the rotary member rotates relative to the fixed member from the first angle to a second angle that is greater than the first angle, the first and second teeth-uncompleted gears and the first shaft are rotated along with the rotary member around the first axis, the first driven gear is disengaged from the first teeth-uncompleted gear, and the second teeth-uncompleted gear drives the second shaft, the second driven gear and the pin to rotate in a second direction around the second axis from the open position to the predetermined position, wherein the second direction is opposite the first direction.

2. The hinge mechanism as claimed in claim 1, wherein the first gear set further has an intermediate gear coupling the first teeth-uncompleted gear to the first driven gear.

3. The hinge mechanism as claimed in claim 2, wherein the first teeth-uncompleted gear has a first no-teeth portion, and when the rotary member rotates relative to the fixed member from the first angle to the second angle, the intermediate gear is in a location that corresponds to the first no-teeth portion.

4. The hinge mechanism as claimed in claim 1, wherein the second gear set further has an intermediate gear coupling the second teeth-uncompleted gear to the second driven gear.

5. The hinge mechanism as claimed in claim 4, wherein the second teeth-uncompleted gear has a second no-teeth portion, and when the rotary member rotates relative to the fixed member from the initial angle to the first angle, the intermediate gear is in a location that corresponds to the second no-teeth portion.

6. The hinge mechanism as claimed in claim 1, wherein the first teeth-uncompleted gear has a first no-teeth portion, and the second teeth-uncompleted gear has a second no-teeth portion, wherein the first and second no-teeth portions are located on opposite sides of a plane defined by the first and second axes.

7. The hinge mechanism as claimed in claim 1, further comprising a third gear set having a driving gear and a fixed gear coupled with each other, wherein the driving gear and the fixed gear are respectively connected to the rotary member and the fixed member.

8. A foldable electronic device, comprising
    a display unit;
    an input unit; and
    the hinge mechanism as claimed in claim 1, wherein the rotary member of the hinge mechanism is connected to the display unit, and the fixed member of the hinge mechanism is connected to the input unit.

9. The foldable electronic device as claimed in claim 8, wherein when the rotary member rotates relative to the fixed member from the initial angle to the first angle, the pin rotates from the predetermined position to the open position and protrudes from a lower side of the input unit.

10. The foldable electronic device as claimed in claim 9, further comprising a bottom cover connected to the input unit, wherein when the rotary member rotates relative to the fixed member from the initial angle to the first angle, the pin pushes the bottom cover to form a gap between the bottom cover and the input unit.

11. The foldable electronic device as claimed in claim 8, wherein when the foldable electronic device comprises a laptop computer.

12. The foldable electronic device as claimed in claim 8, wherein the first gear set further has an intermediate gear coupling the first teeth-uncompleted gear to the first driven gear.

13. The foldable electronic device as claimed in claim 12, wherein the first teeth-uncompleted gear has a first no-teeth portion, and when the rotary member rotates relative to the fixed member from the first angle to the second angle, the intermediate gear is in a location that corresponds to the first no-teeth portion.

14. The foldable electronic device as claimed in claim 8, wherein the second gear set further has an intermediate gear coupling the second teeth-uncompleted gear to the second driven gear.

15. The foldable electronic device as claimed in claim 14, wherein the second teeth-uncompleted gear has a second no-teeth portion, and when the rotary member rotates relative to the fixed member from the initial angle to the first angle, the intermediate gear is in a location that corresponds to the second no-teeth portion.

16. The foldable electronic device as claimed in claim 8, wherein the first teeth-uncompleted gear has a first no-teeth portion, and the second teeth-uncompleted gear has a second no-teeth portion, wherein the first and second no-teeth portions are located on opposite sides of a plane defined by the first and second axes.

17. The foldable electronic device as claimed in claim 8, further comprising a third gear set having a driving gear and a fixed gear coupled with each other, wherein the driving gear and the fixed gear are respectively connected to the rotary member and the fixed member.

\* \* \* \* \*